(12) United States Patent
Santos

(10) Patent No.: US 10,628,997 B2
(45) Date of Patent: Apr. 21, 2020

(54) METHOD FOR GENERATING THREE-DIMENSIONAL MODELS FROM CONSTRAINED SKETCHES AND AN INSTRUCTION SET

(71) Applicant: Emilio Santos, North Mankato, MN (US)

(72) Inventor: Emilio Santos, North Mankato, MN (US)

( * ) Notice: Subject to any disclaimer, the term of this patent is extended or adjusted under 35 U.S.C. 154(b) by 0 days.

(21) Appl. No.: 16/111,901

(22) Filed: Aug. 24, 2018

(65) Prior Publication Data

US 2019/0066374 A1 Feb. 28, 2019

Related U.S. Application Data

(60) Provisional application No. 62/549,737, filed on Aug. 24, 2017.

(51) Int. Cl.
| | |
|---|---|
| *G06T 17/00* | (2006.01) |
| *G06T 17/10* | (2006.01) |
| *G06F 16/583* | (2019.01) |

(52) U.S. Cl.
CPC .......... *G06T 17/10* (2013.01); *G06F 16/5854* (2019.01); *G06T 17/00* (2013.01); *G06T 17/005* (2013.01)

(58) Field of Classification Search
None
See application file for complete search history.

(56) References Cited

U.S. PATENT DOCUMENTS

| | | |
|---|---|---|
| 5,744,081 A | 4/1998 | Tanigawa et al. |
| 6,097,840 A | 8/2000 | Shiitani et al. |
| 6,215,493 B1 | 4/2001 | Fujita |
| 6,823,299 B1 * | 11/2004 | Contreras ............... G06F 8/24 345/419 |
| 7,760,932 B2 | 7/2010 | Lee et al. |
| 8,253,731 B2 | 8/2012 | Hoguet |
| 8,767,048 B2 | 7/2014 | Jung et al. |
| 8,818,076 B2 | 8/2014 | Shenkar et al. |

(Continued)

*Primary Examiner* — Phi Hoang
*Assistant Examiner* — Steven Z Elbinger
(74) *Attorney, Agent, or Firm* — Dunlap Bennett & Ludwig PLLC

(57) ABSTRACT

A method for three-dimensional modeling through constrained sketches for obtaining potentially infinite variations of any one model is provided. The method generates three-dimensional modeling through constrained sketches and its related operations with the objective of obtaining potentially infinite variations of any one model by performing the following steps: acquiring the seed two-dimensional geometry of the model; acquiring a set of identifiers attaching semantic meaning to geometric portions; acquiring a set of instructions, where each instruction possesses inputs and outputs and performs a specific task. A minimal set of instructions capable of building a class of three-dimensional models include specifying constrained sketches to some of the instructions, which may contain valid ranges for values, labelling geometric primitives, matching sketches to arbitrary geometry and traversing the instruction set using any matched geometry as initial input, selecting random values for applicable ranges and producing a unique three-dimensional model after all instructions execute.

1 Claim, 7 Drawing Sheets

(56) References Cited

U.S. PATENT DOCUMENTS

| | | | |
|---|---|---|---|
| 8,941,645 B2 | 1/2015 | Grimaud | |
| 9,279,905 B2 | 3/2016 | Ronot et al. | |
| 9,830,730 B2 | 11/2017 | Ai | |
| 9,830,735 B2 | 11/2017 | Koike et al. | |
| 9,990,764 B2 | 6/2018 | Bell et al. | |
| 2001/0020946 A1 | 9/2001 | Kawakami et al. | |
| 2001/0033283 A1 | 10/2001 | Liang et al. | |
| 2006/0066607 A1* | 3/2006 | Schmittler | G06T 15/06 345/419 |
| 2007/0185946 A1* | 8/2007 | Basri | G06K 9/34 708/200 |
| 2008/0100616 A1 | 5/2008 | Yamazaki et al. | |
| 2008/0166065 A1 | 7/2008 | Pizlo et al. | |
| 2008/0310762 A1 | 12/2008 | Lee et al. | |
| 2009/0110307 A1* | 4/2009 | Markowitz | G06T 17/10 382/232 |
| 2009/0195536 A1* | 8/2009 | Louise | G01R 13/0236 345/419 |
| 2010/0060635 A1* | 3/2010 | Corcoran | G06F 17/5086 345/420 |
| 2010/0214284 A1 | 8/2010 | Rieffel et al. | |
| 2011/0181589 A1 | 7/2011 | Duan et al. | |
| 2012/0173208 A1* | 7/2012 | Houdouin | G06F 17/50 703/1 |
| 2014/0233845 A1 | 8/2014 | Wagner et al. | |
| 2014/0341463 A1 | 11/2014 | Ramalingam et al. | |
| 2014/0362108 A1 | 12/2014 | Aguera-Arcas | |
| 2015/0186552 A1 | 7/2015 | Acharya et al. | |
| 2015/0339572 A1* | 11/2015 | Achin | G06N 5/02 706/46 |
| 2018/0240243 A1* | 8/2018 | Kim | G06T 7/11 |

* cited by examiner

METHOD FOR GENERATING THREE-DIMENSIONAL MODELS FROM CONSTRAINED SKETCHES AND AN INSTRUCTION SET

CROSS-REFERENCE TO RELATED APPLICATION

This application claims the benefit of priority of U.S. provisional application No. 62/549,737, filed 24 Aug. 2017, the contents of which are herein incorporated by reference.

BACKGROUND OF THE INVENTION

The present invention relates to procedural modelling and, more particularly, to a visual method for generating three-dimensional (3D) models from constrained sketches and an instruction set. Procedural modeling is creating 3D models from a rule set. Which suggests the possibility of the cost-effective creation of infinite variations of 3D models. Unfortunately, the production of massive amounts of 3D models has been, and still is, a major bottleneck in digital pipelines such as games and movies, just to name a couple industries. As a result, the quantity and quality of 3D assets is likely to influence the outcome of the endeavors using them.

Currently, however, creating high quality 3D models is largely a manual, time consuming process that requires a prerequisite level of skill. A high-quality architectural model, for instance, can take a competent modeller weeks to complete. Therefore, when faced with the need for thousands of models, companies are forced to hire a large number of employees and/or accept lower quality assets.

Furthermore, it is also difficult to apply modifications to large amounts of 3D models once produced. Thus, once massive amounts of assets have been created, applying modifications to specific element (i.e. the width of a window frame) can be a very difficult task, further requiring a large team of practitioners.

In order to overcome these limitations many methods in the fields of procedural modelling have been proposed. A popular approach, for which several patents have been granted, try to reconstruct 3D meshes from images and/or video. The inventor considers these methods orthogonal to the present invention in the sense that the objective of reconstruction is to reproduce existing objects whereas the present invention intends to create new ones. Moreover, reconstructing from existing images or videos cannot create new versions.

Other approaches generate 3D models based on a set construction rules. Such rules are traditionally expressed as a grammar and can be considered state of the art. These methods require skills more often found in software engineers rather than in artists. This approach, requiring possession of a certain level of software engineering skills, does not unclog the bottleneck. Moreover, the counterintuitive nature of current construction rules exacerbates the challenge to visualize potential variations of an existing 3D model.

None of these current methods have had much success outside of academia or been known to produce quality results or clear commercial solution. In short, current procedural generators today lack quality, lack extensibility, and are difficult to use except for the highly skilled modeller. It is clear that an alternative method needs to be devised where designers/modellers can drive the modelling process and high-quality results can be obtained. With the advent of virtual reality and the fusion of several disciplines (architecture, for instance) with computer science, a clear need has emerged for our invention providing a more intuitive interface as well as an extensibility not currently provided.

As can be seen, there is a need for an intuitive method for generating three-dimensional models from constrained sketches and a small instruction set, drawings and human-readable descriptions, allowing on-technical users to intuitively define models in a way that unlimited variations are obtainable, while producing better results than the state of the art.

Modelling with the method embodied in the present invention enables users to graphically and conceptually design their models. Users are able to specify the constraints to their models in human language and a set of connected instructions performs a construction process that meets said constraints. Potentially infinite models meeting said constraints can be found.

The present invention embodies a novel method based on sketches, constraints and instructions. Once the model is created, any geometry matching the sketch can be used to generate a 3D model satisfying the user design and its constraints. Even without changing the geometry, some constraints may allow valid ranges for values. In this case, the system is capable of generating different models within said ranges. Even without ranges, the system is capable of using randomized construction methods or materials to produce infinite variations that conform to the user design. Any changes in parameters can easily be propagated automatically through the system.

SUMMARY OF THE INVENTION

In one aspect of the present invention, a visually intuitive method for generating an infinite variation of three-dimensional models includes the following process steps: defining a starting sketch, the starting sketch comprising a polygon having a plurality of geometric primitives, wherein at least one geometry primitive of the plurality of geometric primitives associated with a constraint; storing in memory a directed graph comprising a plurality of nodes ordered in series; each node representing a type of instruction of a set of instructions; and providing a solver to asynchronously apply each of the plurality of nodal instructions, wherein the starting sketch is an initial input of the set of instructions.

In another aspect of the present invention, the visually intuitive method for generating an infinite variation of three-dimensional models includes the following process steps: defining a starting sketch, the starting sketch comprising a polygon having a plurality of geometric primitives, wherein at least one geometry primitive of the plurality of geometric primitives associated with a constraining label; storing in memory a directed graph comprising a plurality of nodes ordered in series; each node representing a type of instruction of a set of instructions, wherein each instruction of the set of instructions configured to convert a set of inputs into at least one output, and wherein the set of instructions includes: a cut instruction is configured to receive a at least one face of the geometric primitive as input and perform a series of partitions to each said face, an overlay, and an extrude instruction; an overlay instruction configured to merge the starting sketch to a second planar geometry so as to fulfill a second set of constraints; and an extrude instruction configured to generate volume to planar surfaces of the polygon based on user-defined profile; at least one select instruction, each select instruction configured to filter a set of primitives based on constraints; and at least one choice instruction, each choice instruction configured to execute a subset of instructions based on a user-defined strategy; providing a solver to asynchronously apply each of the plurality of nodal instructions, wherein the starting sketch is an initial input of the set of instructions; and coupling a database to the solver, the database retrievably storing a plurality of arbitrary geometries, wherein the solver is configured to match each arbitrary geometry to the starting sketch based in part of the at least one constrained geometric primitive, and wherein the solver is configured to recursively redirect each match as the initial input of the set of instructions.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring to FIGS. 1 through 8B, the present invention may include at least one computing device with a user interface. The computing device may include at least one processing unit and a form of memory including, but not limited to, a desktop, laptop, and smart device, such as, a tablet and smartphone. The computing device includes a program product including a machine-readable program code for causing, when executed, the computing device to perform steps. The program product may include software which may either be loaded onto the computing device or accessed by the computing device. The loaded software may include an application on a smart device. The software may be accessed by the computing device using a web browser. The computing device may access the software via the web browser using the internet, extranet, intranet, host server, internet cloud and the like.

Figure 1:
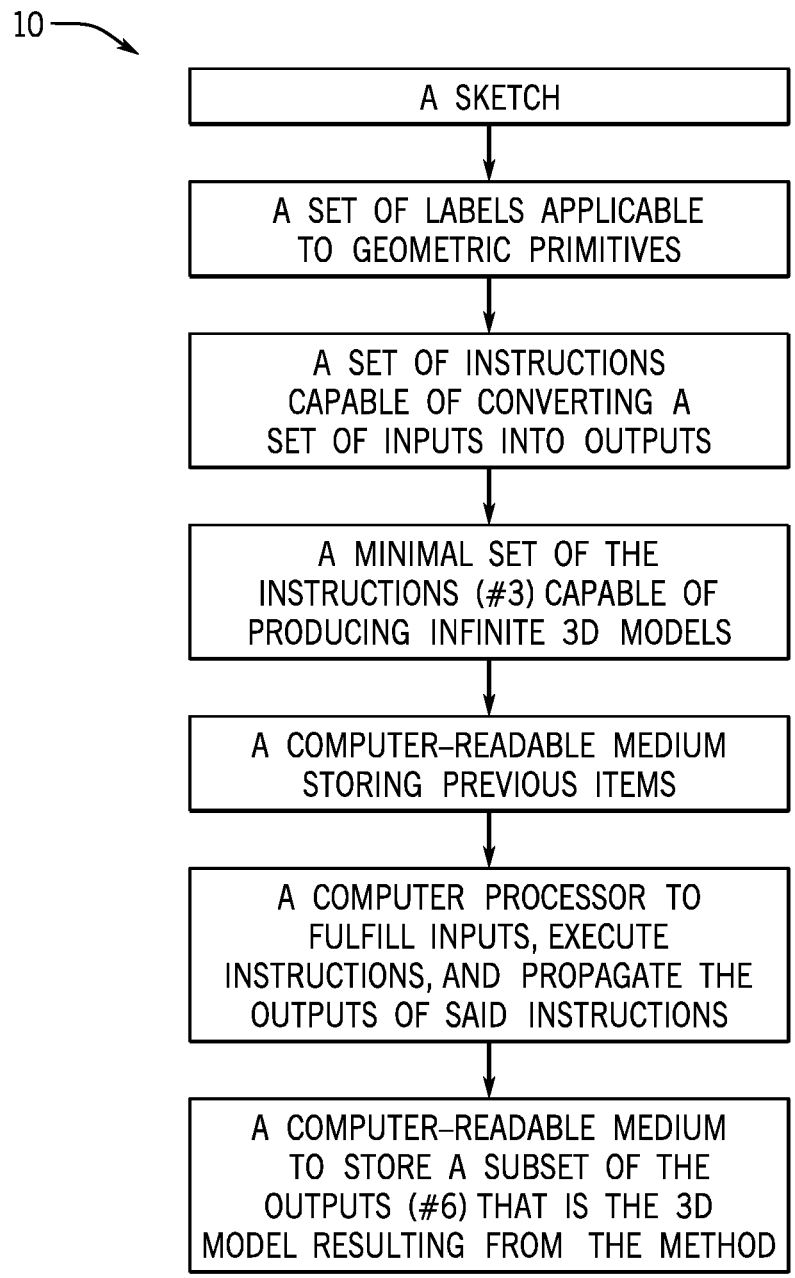
FIG. 1 is a flowchart of an exemplary embodiment of the present invention.
Figure 2:
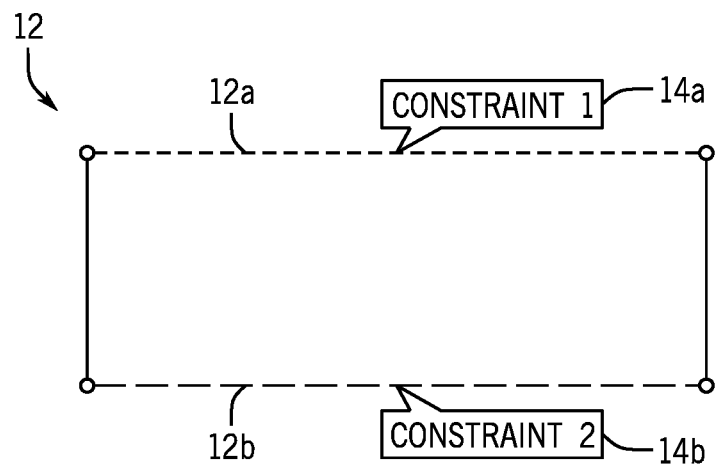
FIG. 2 is a representation of a sketch of an exemplary embodiment of the present invention.
Figure 3:
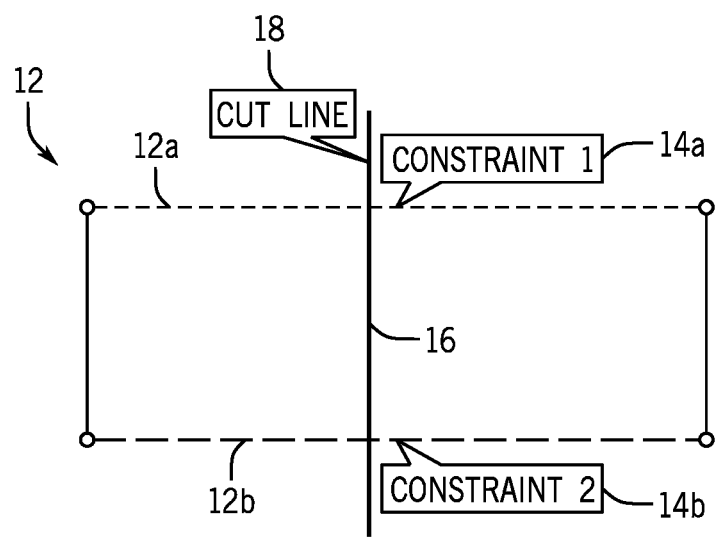
FIG. 3 is a representation of a sketch of FIG. 2 with a cut line of an exemplary embodiment of the present invention.

Referring to FIG. 1 through FIG. 3, the present invention embodies a three-dimensional modelling system 10 for generating 3D models from constrained sketches 12 and a small instruction set, drawings and human-readable descriptions. The systemic components may include a constrained sketch 12, which may include a geometric shape, such as a polygon, wherein one or more of the geometric primitives of the geometric shape is associated with constraints (12a, 12b and 16); these constraints may be a set of labels (14a, 14b and 18 respectively) applicable to said geometric primitives; a set of instructions capable of converting a set of inputs into outputs (for example, a cut line 16 constraining the sketch 12); a minimal subset of the set of the instructions capable of producing infinite 3D models; a computer-readable medium storing previous items; a computing device processor to fulfill inputs, execute instructions and propagate the outputs of said instructions; and a computer-readable medium to store a subset of the propagated outputs that is the 3D model resulting from the method embodied in the present invention.

Initially, the sketch 12 may be applied with labels 14a and/or 14b, and injected as input into the instructions connected to the sketch. All instructions, once their inputs are fulfilled, will be executed and likely add geometry that will serve as input to other instructions. Once all possible instructions have been executed the resulting geometry is a valid variation of the user's design. By running the process again with different values within the valid ranges of instructions will produce a different, valid, variation up to potentially infinite variations.

In a certain embodiment, a basic set of instructions have been determined to produce a large class of 3D models. These instructions are: 1—Sketch; 2—Cut; 3—Overlay; 4—Select; 5—Choice; and 6—Extrude. Many others instructions can be added in alternative embodiments.

The instructions resemble a virtual machine without conditionals or loops but certainly with subroutines. Visually, we represent our instruction set as a directed asynchronous graph starting on the initial sketch. Any group of connected instructions can be transformed into a subroutine (or function). The execution of steps is not sequential but completely asynchronous as an instruction is fired as soon as its inputs are met.

Figure 4:
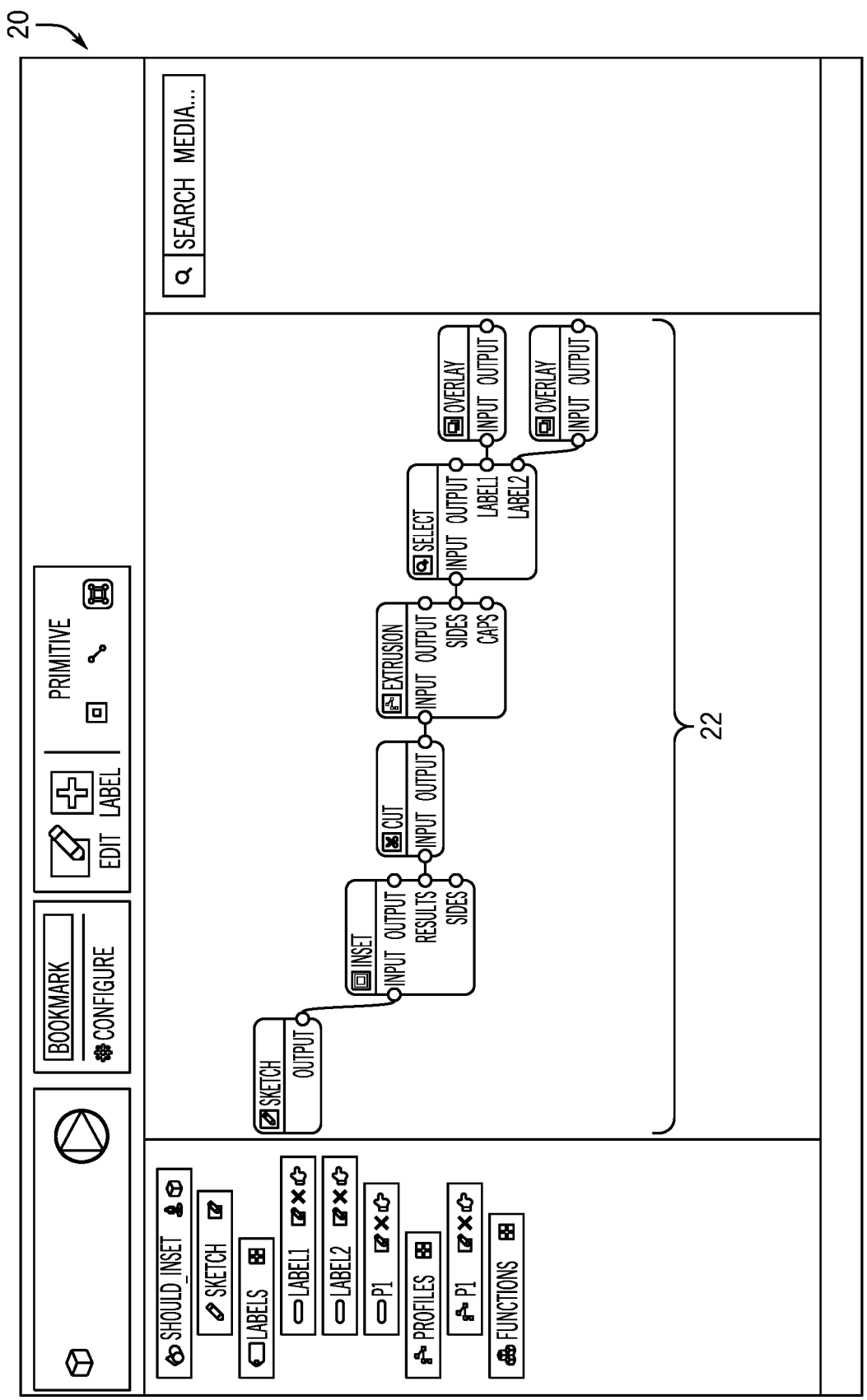
FIG. 4 is a schematic view of a modeling screenshot an exemplary embodiment of the present invention.

A method of making the present invention may include the following. A coder would create software capable of describing and executing the concepts of the invention, including but not limited to a system capable of reading: a list of labels (14a, 14b, 18, 28, 28a, 28b etc.); geometry (polygons, et al) capable of contain labels assigned to its geometric components (in particular, edges); a directed graph of instructions 22 (representable through user interface modeling tools 20, as illustrated in FIG. 4), and a system capable of executing the following steps matching arbitrary geometry to a sketch 12 using constraints. Such constraints can refer to a label or a physical property of the geometry or any other predicate. Storing inputs on instructions until all the specified inputs have value or are optional, executing instructions based on its inputs, and collecting outputs of executed instructions and propagating such outputs to other instructions as specified by the user would also be provided. Also applicable would be a system where at least the following instructions are available: a sketch instruction (initial labeled geometry); a cut instruction matching its input to a constrained sketch and capable of executing a sequence of constrained cuts; an overlay instruction matching a base constrained sketch to its input and merging a second planar geometry as to fulfill a second set of constraints; a select instructions capable of searching the geometry supplied as input and returning, as an output, only the primitives matching a user-provided set of predicates; a choice instruction that will only execute a subset of potential instructions, creating logical variations; an extrude instruction that will give volume to planar surfaces based on user-defined parameters that may include profiles. The list of possible instructions is constrained only by a user's imaginations and includes all algorithms in the computing device graphics literature.

A method of using the present invention may include the following. A user may define a starting (or root) sketch 24 as a labeled polygon or similar and will proceed to apply instructions to it in order to arrive at a 3D model of its design. Once this model is created, the user will mix and match instructions at will. For a simple usage, by way of illustration, a user may create a rectangular sketch and label the faces "front", "back" and "side" appropriately. The output of that instruction will be redirected into the input of a new instruction of type "Cut" where the floorplan of the house will be created as successive cuts. The resulting segments will be assigned profiles (2D paths showing how the walls will go up and form the roof). The output of the cut instruction will be fed into a new extrude instruction that will create the house's volume based on the profiles assigned to each segment.

The invention herein introduced creates 3D models by executing a series of connected steps (or instructions), each individual one being capable of creating geometry and providing input to further steps. Each instruction can have unlimited number of inputs and outputs and will perform a particular function when said inputs are fulfilled. Although potentially infinite, the present invention introduces a minimal set of instructions capable of producing the 3D models covered by the present invention.

Figure 5A:
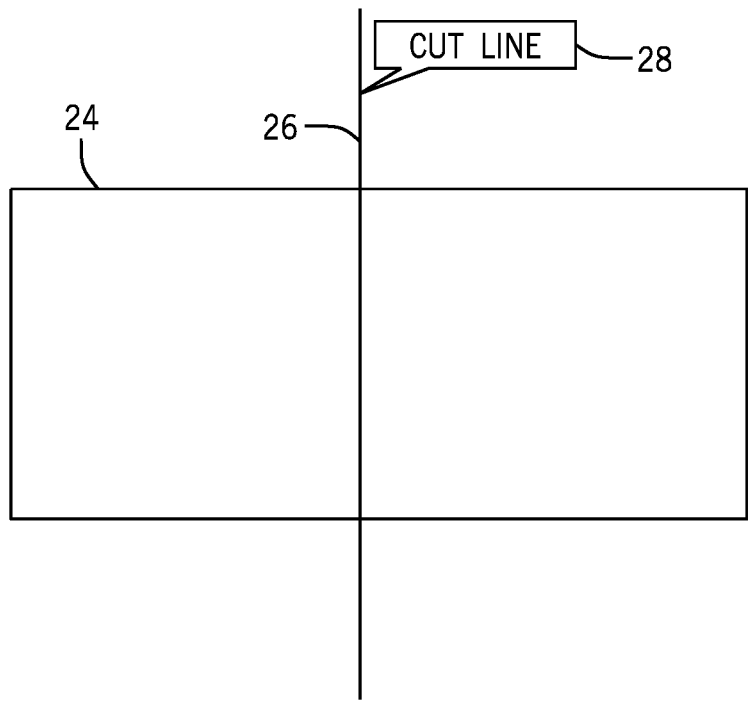
FIG. 5A-5C is a schematic view of the steps of a cut operation of an exemplary embodiment of the present invention.
Figure 5B:
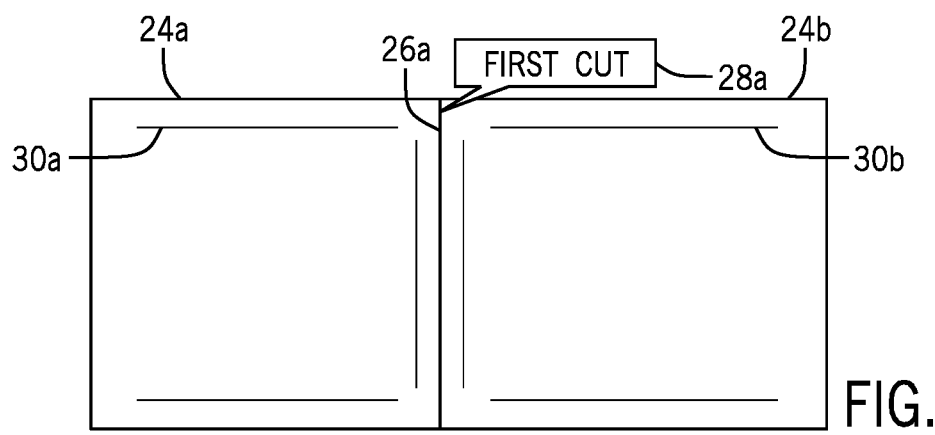
Figure 5C:
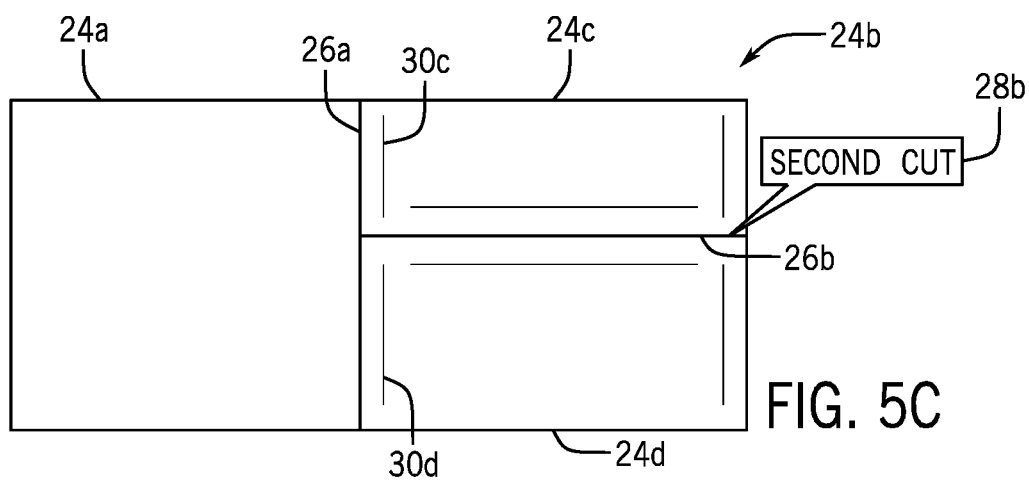

Referring to FIGS. 5A through 5C, an initial input to the modelling system 10 may be an arbitrary planar geometry matching the model's sketch 12. FIG. 5A shows a root sketch 24 with a cut operation 26 applied to it by way of one or more cut lines 26a, 26b, etc. On FIG. 5B, lines 24a and 24b, represent the resulting sections resulting from a first cut line 26a. By way of example, a second cut line 26b to section 24b, would result in sections 24c and 24d, as illustrated in FIG. 5C. Lines 30a through 30d may be indicators of the resulting cut (and thus constrained) sections 24a through 24d, respectively. As discussed further herein, such cut lines are constraints on the root sketch 24, and so can be represented by label 28 for a cut line 26; specifically, label 28a for the first cut line 26a, and label 28b for the second cut line 26b. The present invention is adapted to match possible target geometries of the resulting sketch of FIG. 5C (originating as root sketch 24) as input to a particular model.

Often, the user will be required to create and apply labels 14a and 14b to geometric primitives on sketches so they are used while matching sketches to production geometries. Labelling is a basic constraint in the present invention. In FIG. 1, for instance, the lines 30a and 30b may represent edges to which a particular label has been applied to.

By substituting the sketch 12 by any planar geometry matching the sketch 12 be able to produce different models. Since the set of planar geometry that matches a sketch is often infinite, the method is capable of producing infinite 3D models.

After a sketch 12 is specified, a directed graph of steps may be specified so the sketch 12 constitutes the first possible input for any instruction. The present invention provides a minimal set of steps able to create 3D models and that form the core of the present invention. In one embodiment of the invention only these steps are used to produce infinite 3D models, these steps are: Sketch; Select; Cut; Overlay; and Extrude. These instructions are capable of producing a suitable output, though other possible steps in the present invention are encouraged. Established, well researched algorithms can be used as steps as long as its primary input can be substituted by one or many geometric primitives.

The initial sketch is not the only instruction making use of constrained sketches. Cuts and Overlays, in particular but not limited to, make use of the technique. In FIG. 5A, thick gray lines are used to depict cut operations. It should be immediately clear that the same cut applied to the sketch in FIG. 5A could be applied in infinite different ways on a production geometry.

At the core of the invention is, then, a solver capable of mapping a runtime geometry to a sketch and apply state operations in a way that satisfy the constraints set by the user, wherein the modeller's role is to find a 3D model that meets the conditions set by all of it steps.

One embodiment may provide functionality for users of the system to collect sketches, instructions and the metadata associated with them. The embodiment will, then, use a solver to execute the instructions, starting with the initial drawing. If a solution is found, in the form of a 3D model, then the process stops satisfactorily.

Instructions are collected as a series of nodes in a graph as represented in FIG. 4. This representation is not uncommon for this type of data structure. Each node will represent a particular type of instruction and it will often have metadata associated with it.

For instance, an inset instruction over a face will the user will specify the inset amount, or a range of possible values for it. This metadata can be as complicated as necessary, often including constrained sketches.

A sketch instruction will determine the constraints on any drawing suitable for generation while using a particular model. The metadata associated with this instruction is a constrained sketch that will be used to match any actual drawing a user wants to create a 3D mesh with. Said sketch will layout the basic requirements for said drawings.

A select instruction will receive a set of geometric primitives as input and will output the subset of said geometric primitives that matches one or more conditions. Said conditions are the metadata associated to the select instruction. These conditions include, but are not limited to: the label applied to the geometric primitive, the length of said primitive if said primitive is an edge or the area if said primitive is a face.

A cut instruction will receive a face or set of faces as input and will perform a series of partitions to said faces. Said partition is the process of: 1. Select a source edge; 2. Select a target edge; 3. Split both source and target edges according to constraints, creating 2 new vertices; and 4. Create an edge connecting the vertices created in step 3, which in turn will split the original face into two new faces.

This process starts with the input and is repeated in recursive fashion. The metadata associated with said cut instruction is a recursive variation of a constrained sketch where one of said sketches would be understood as the "root". Said root sketch represents the conditions expected to be met by the input. FIG. 5A shows a root sketch and a user action for the first cut. Note that for a cut instruction to be valid, at least one cut should have been performed by the user. After said first cut, two new faces will be created and each is to be treated as a constrained sketch itself. The present invention uses a selection based on the selected cut as depicted in FIG. 5B. of the segments created by the selected cut are displayed individually. FIG. 5C shows selection after a successive cut.

The present invention allows the collection of facts regarding cuts. In the context of a cut instruction, a fact may represent a regular constraint (i.e. "The first cut must be parallel to an input segment labeled X") or a statement about the result of a cut. For instance: "The created segment Y will be labeled Z", where X and Z are labels and Y is an edge resulting from a particular cut in the instruction.

Said cut operation is also capable of repeating itself along an axis or between source and target segments. This operation is vital in several common scenarios where the dimensions of the target geometry are unknown and the user's intentions are to fit either a certain number of cuts or as many cuts of certain dimensions as possible.

One embodiment of the present invention allows said cut operation to be applied to 3D meshes in addition to 2D arrangements. A person versed in the art would recognize the solver needed to carry this operation to be very similar to the planar case. For instance, a repeat operation, instead of performing cuts between two segments can do so between two planes Furthermore, the same distance and angle constraints should apply as well.

An overlay instruction will superimpose a geometry onto another following a set of constraints specified by the user. The metadata collected for this instruction consist of at least two constrained sketches often overlapping one another. Said metadata will contain, as well, one or more drawings of which one will be selected at runtime, said drawing will be referred to as the "target". Conversely, we will call "source" to the input geometry to match the first sketch.

As well as the separate constrained sketches, the user will be able to specify conditions for the intersection of both sketches. The conditions may be considered "overlay constraints". In a mechanism similar to the cut instruction, the solver may: 1. Match the source to the first specified sketch; 2. Match the target to the drawing been overlaid; and 3. Find a combination of position and rotation for the target drawing that satisfies the overlay constraints.

If a cut instruction allows a model to grow "inwards" then an overlay will allow outward growth. In other words, the present invention allows for the addition of detail to the models by both subdivision and composition. Enabling the user to add any type of detail to 2D geometry.

While it should be understood that an embodiment could implement a solver capable of applying these instructions to 3D meshes, the inventor's method has proven sufficient when applied over 2D drawings. It should be noted, as well, that 3D faces can be projected onto the 2D plane making them suitable for said instructions.

Referring the FIGS. 6A through 8B, the intention of creating 3D models requires that volume is eventually created. For this purpose, an extrusion instruction is provided. At its simplest, an extrusion will create volume by first creating a 3D representation of a 2D face by converting vertices from (x, y) coordinates to (x, 0, y) or, to be more general, by inversely projecting a 2D face onto a 3D plane. A second 3D geometry 44 may then create by translating the newly created 3D geometry on the Y axis, resulting in a second 3D rendering 46 incorporating the second 3D geometry 44. Lastly, for each edge of the geometry a quadrilateral face will be created connecting the original edge with the translated edge, thus creating a volume.

Figure 6A:
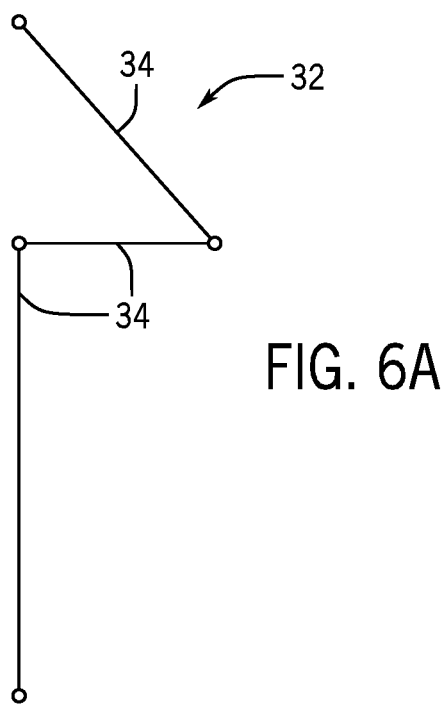
FIG. 6A is a schematic view of a profile geometry an exemplary embodiment of the present invention.
Figure 6B:
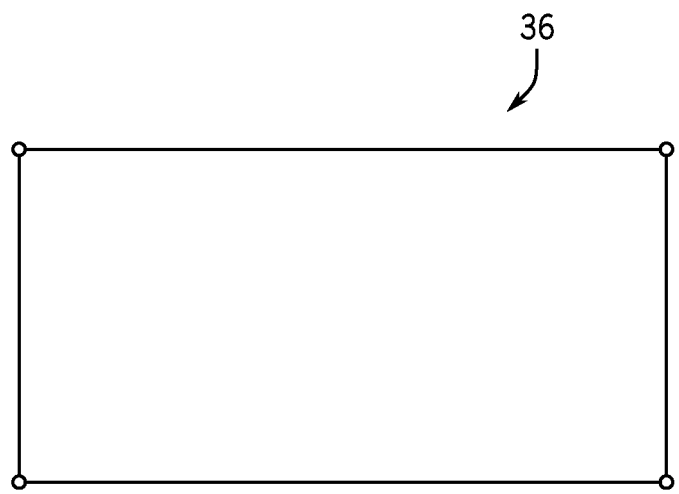
FIG. 6B is a schematic representational view of an extrusion of the profile geometry an exemplary embodiment of the present invention.
Figure 6C:
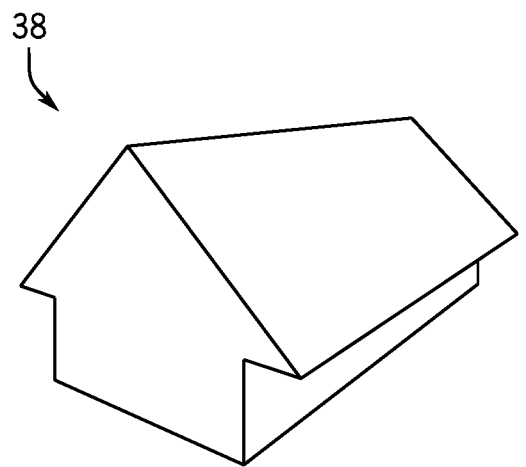
FIG. 6C is a three-dimensional representation of the profile geometry and the extrusion of FIGS. 6B and 6C, respectfully, of an exemplary embodiment of the present invention.

Under this method, each edge of the projected 3D geometry will "move" in the Y direction according to a profile 32. This profile 32 may, in some embodiments, be a 2D building profile sketch with constraints 34. Said profile 32 may be no more than a 2D open curve as will be explained in more detail below. The geometry in FIG. 6B represents the extruded length 36 of the profile 32 (wherein the profile may be attached along the top and bottom edges). FIG. 6C depicts a basic 3D rendering 38 (here, a house) obtained from the profile 32 in FIG. 6A.

Figure 8A:
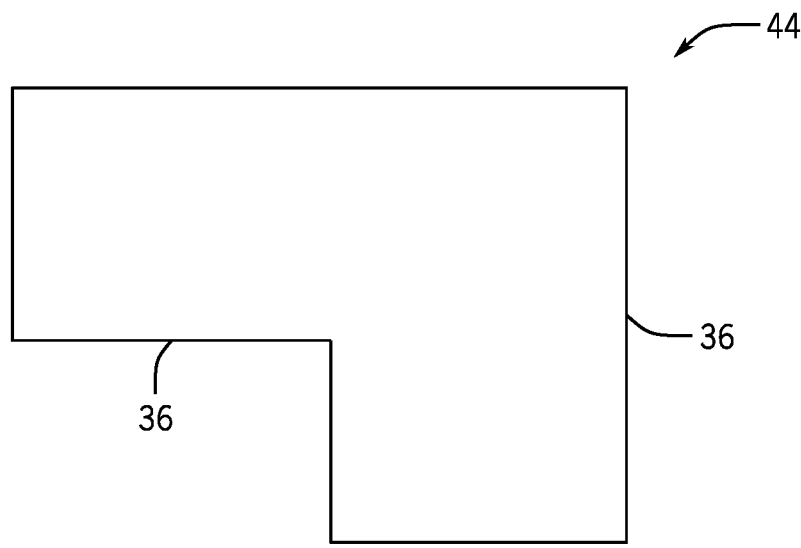
FIG. 8A is a schematic view of a second geometry developed from FIG. 6A an exemplary embodiment of the present invention.
Figure 8B:
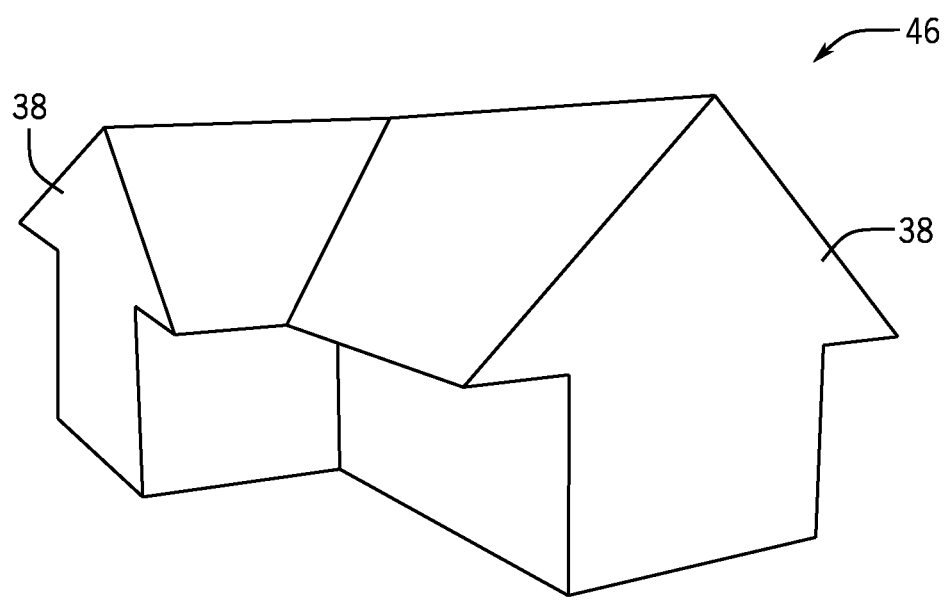
FIG. 8B is a three-dimensional representation of the second geometry of an exemplary embodiment of the present invention.

Referring to FIGS. 8A and 8B, the extrude instruction may be combined with the overlay instruction configured to merge the starting sketch 32 to a second planar geometry 44 so as to fulfill a second set of constraints. Specifically, the second 3D geometry 44 may be created by translating the newly created 3D geometry on the Y axis, resulting in a second 3D rendering 46 incorporating the second 3D geometry 44. Lastly, for each edge of the geometry a quadrilateral face will be created connecting the original edge with the translated edge, thus creating a volume.

The apparatus herein presented for the present invention fulfill the requirements for data collection outlined herein. In particular, certain embodiments allow for the collection of labels, identified by a unique name and a color. Said colors are used to visually identify the geometric primitives having said label applied. A label, besides being a pure identifier used by constraints, can also contain metadata of its own. A label may contain a reference to an existing profile. Said reference will be used by the extrusion instruction to correctly determine the profile associated to a particular edge. Furthermore, said label may contain a material that a renderer would apply to faces with said label applied to. Furthermore, said label may contain custom metadata in for form of [key, value] useful for constraints or for further processing after generation.

Figure 7:
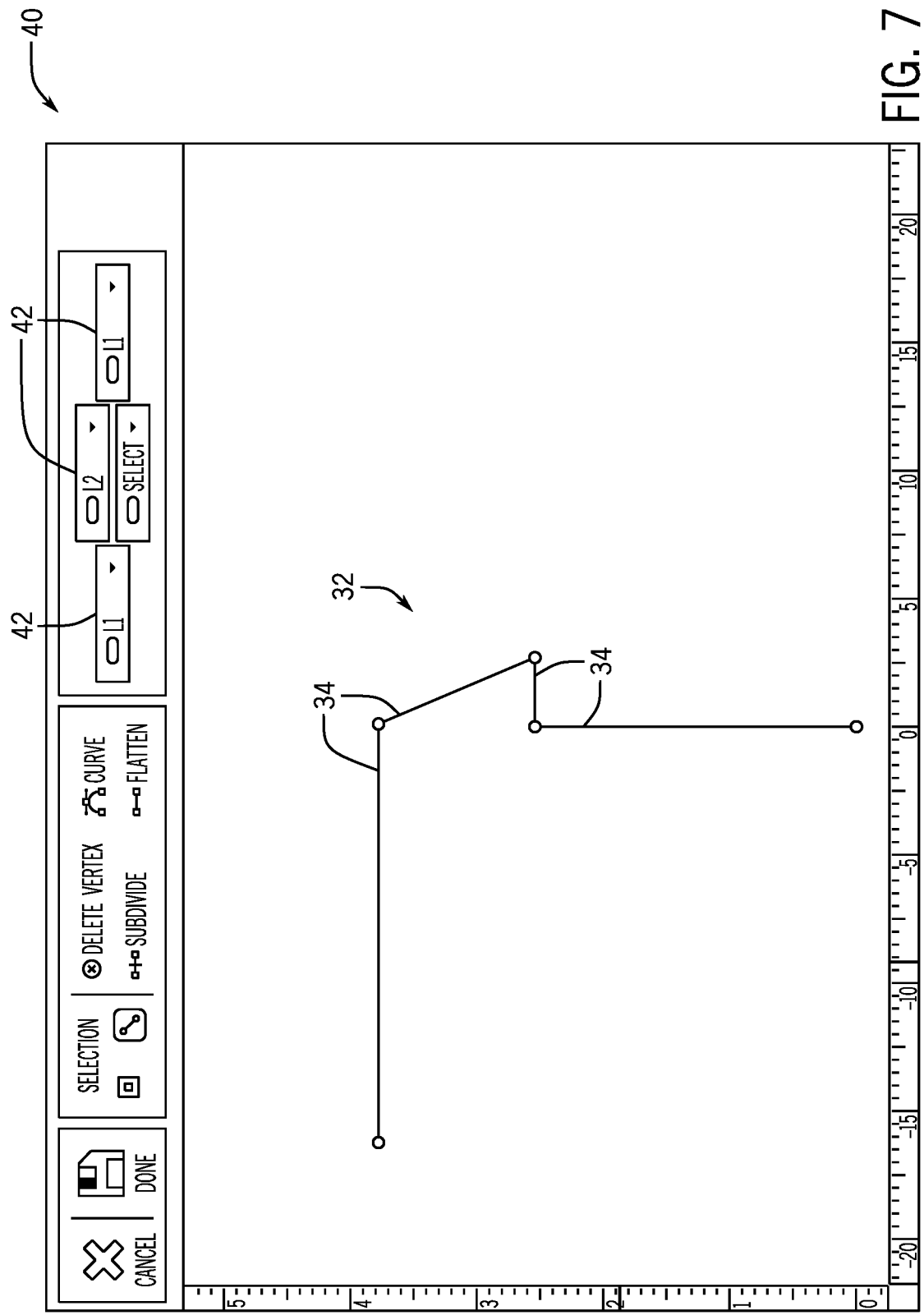
FIG. 7 is a schematic view of a modified profile an exemplary embodiment of the present invention.

The present invention also may fulfill the collection of profiles requirement through a systemic user interface modelling tool 40, similar to the one in FIG. 7, allowing the user to create profiles as a series of segments, with the aid of variable modelling parameter settings 42. It is worth noting that profiles may move either "up" or "down" in other words, either protruding or cratering a geometry. Profiles always start at the origin and whether all segments are on the positive or negative side of the Y=0 line will determine their orientation.

Furthermore, each profile segment 34 can be labelled. During the extrusion process, each profile segment is responsible for at least one quadrangular face. Such faces will then be labelled according to the segment's label. The edges of said quadrangular face can also be configured per profile segment, as shown in FIG. 6B. Such labelling is often useful to perform cuts on such faces. A person versed in the art would recognize the potentially infinite chain of cut/extrude pairs and its potential to model very complex models.

As described, the modelling technique we are presenting is capable by itself of generating as many variations of a model as solutions there are for the constraints in the model. The number of such solutions is often infinite. However, it is difficult to introduce radical variations: a particular cut can be executed in infinite ways but its structure remains largely the same. In other words, any two solutions to the same cut are topologically equivalent. One embodiment of this invention introduces a choice instruction where the next instruction to be executed is chosen among several possibilities.

The choice instruction illustrates the extensibility that is inherent to the present invention modelling technique: there is a wide variety of potential instructions to be added. As it was mentioned before, any geometric algorithm can be easily implemented as a system with at least one input and an output. In particular, one embodiment offers an inset instruction based on the well-researched straight skeleton algorithm.

Furthermore, reusability steps, inspired by computer science are present in one embodiment. Any chain of steps can be converted into a function, which defines a new instruction that can be used anywhere in the instruction graph to perform the chain of instructions that originated the function. Said function will take its input from the first instruction in the original instruction set, the outputs are computed initially by collecting any output going outside the function. After created, the user will be able to add and remove outputs and inputs.

Furthermore, and in order to provide complete extensibility, a script instruction may be provided in an embodiment so given an input, often in the form of a set of geometric primitives, the user is able to produce an output by using a programming language.

One embodiment of the present innovation takes advantage of the fact that solutions are often found for any reasonable geometry. Said embodiment would provide instructions describing more complex structures containing features to be used as input for models made by one embodiment. Just as an example, a city might be planned (or imported) so the spaces where buildings are expected can invoke one of possible many models. Thereby generating automatic content at large scale.

Two or more results may be obtained by using two different production geometries. Those versed in the art would understand how radically different models may be obtained using this technique. In particular, an embodiment of the invention will be able to interpolate among production geometries. Said interpolation may include constraints so the results are not only infinite, but also correct.

Although the invention has been presented with specific embodiments, many alternatives, modifications and variations will be apparent to those skilled in the art. As such, the present invention intends to embrace all such alternatives, modifications and variations that fall within the spirit and broad scope of the invention.

Three-dimensional models built by the present invention may be semantic models as well, by which it is meant that the output of our modeling technique carry the metadata specified by its label, in one embodiment, the user is allowed to add custom metadata to labels. Said custom metadata can be then used by select instructions and solvers alike. Further, this semantic information can be exported along with the geometry. This information may be used, for instance, by further steps on a geometry processing pipeline.

One embodiment of the present invention produces parametric models by adding a node connector type. The preferred embodiment needs only inputs/outputs to carry geometric primitives. However, there is no limitation about to the nature of inputs and outputs in our invention. In the parametric case, a new connector type "Data" will be created and flow through the model in the same manner as the geometry. The values for such data may be randomly or user selected.

Another embodiment of the present invention produces parametric models by adding variables, which represent values or ranges that are controlled by the user and that can be shared among instructions.

Further, parametrization provides the opposite functionality to infinite variations: the ability to reproduce a particular model, or feature within a model on distinct runs of a solver. For instance, a particular item may be selected from a choice instruction to control a particular execution path on a particular set of results while staying random on others. This combination of randomness and specificity will allow users to create high quality 3D models while maintaining diversity.

One embodiment of the present invention allows for specialty solvers to be applied to our models. Said solvers may range from optimizing solutions to real world constraints such as construction codes. This invention can also be used in cases where only one version of a model is needed, but the user wants to choose from among many choices. As such, the invention would be capable to produce optimized and/or ready to build structures. Imagine an architect being able to showcase many different possibilities all sharing the same style.

The computing device-based data processing system and method described above is for purposes of example only, and may be implemented in any type of computing device system or programming or processing environment, or in a computing device program, alone or in conjunction with hardware. The present invention may also be implemented in software stored on a computing device-readable medium and executed as a computing device program on a general purpose or special purpose computing device. For clarity, only those aspects of the system germane to the invention are described, and product details well known in the art are omitted. For the same reason, the computing device hardware is not described in further detail. It should thus be understood that the invention is not limited to any specific computing device language, program, or computing device. It is further contemplated that the present invention may be run on a stand-alone computing device system, or may be run from a server computing device system that can be accessed by a plurality of client computing device systems interconnected over an intranet network, or that is accessible to clients over the Internet. In addition, many embodiments of the present invention have application to a wide range of industries. To the extent the present application discloses a system, the method implemented by that system, as well as software stored on a computing device-readable medium and executed as a computing device program to perform the method on a general purpose or special purpose computing device, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A visually intuitive method for generating an infinite variation of three-dimensional models, comprising:
   defining a starting sketch, the starting sketch comprising a polygon having a plurality of geometric primitives, wherein at least one geometry primitive of the plurality of geometric primitives is associated with a constraining label;

storing in memory a directed graph comprising a plurality of nodes ordered in series; each node representing a type of instruction of a set of instructions, wherein each instruction of the set of instructions configured to convert a set of inputs into at least one output, and wherein the set of instructions comprises:
- at least one cut instruction, each cut instruction is configured to receive at least one face of the geometric primitive as input and perform a series of partitions to each said face, an overlay, and an extrude instruction;
- at least one overlay instruction, each overlay instruction configured to merge the starting sketch to a second planar geometry so as to fulfill a second set of constraints;
- at least one extrude instruction, each extrude instruction configured to generate volume to planar surfaces of the polygon based on user-defined profiles;
- at least one select instruction, each select instruction configured to filter a set of primitives based on constraints; and
- at least one choice instruction, each choice instruction configured to execute a subset of instructions based on a user-defined strategy;

providing a solver to asynchronously apply each of the plurality of nodal instructions, wherein the starting sketch is an initial input of the set of instructions; and coupling a database to the solver, the database retrievably storing a plurality of arbitrary geometries, wherein the solver is configured to match each arbitrary geometry to the starting sketch based in part of the at least one constrained geometric primitive, and wherein the solver is configured to recursively redirect each match as the initial input of the set of instructions.

* * * * *